W. R. CEPERLY.
WATER KETTLE.
APPLICATION FILED MAY 21, 1915.
1,169,006.
Patented Jan. 18, 1916.
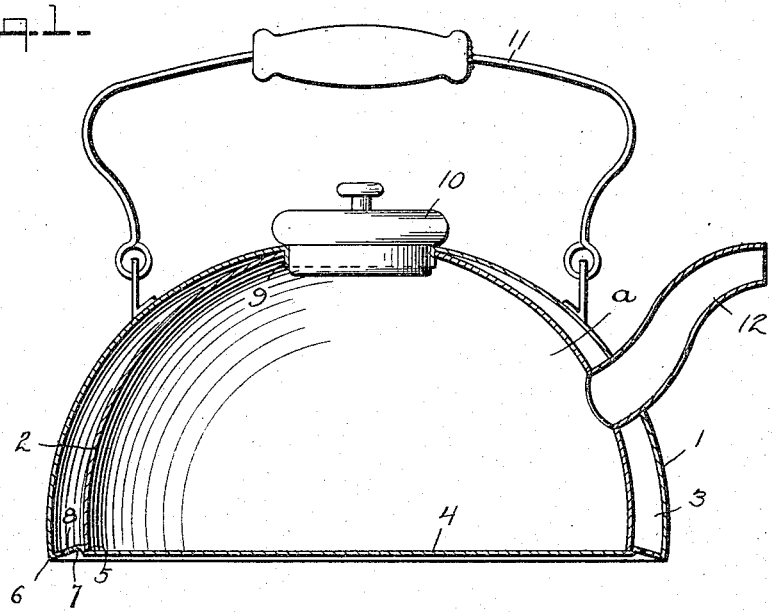
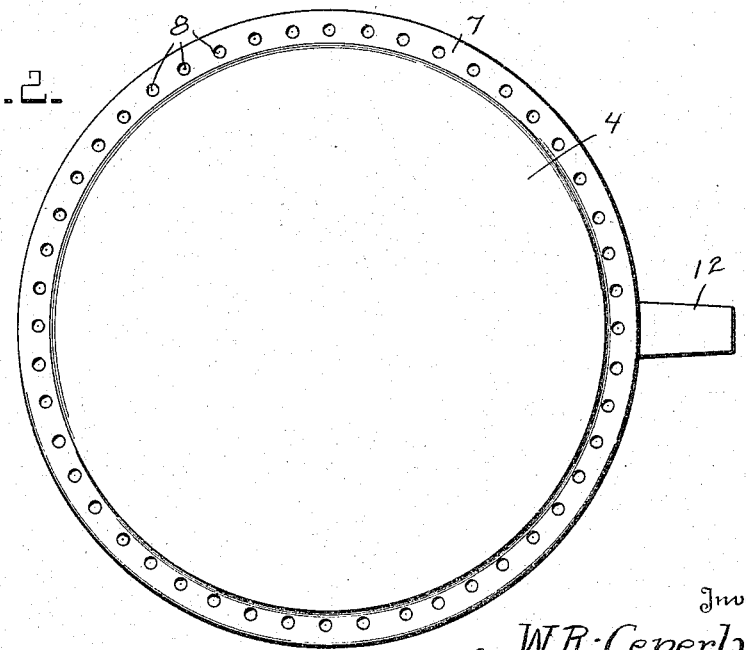
Witnesses
Inventor
W R· Ceperly
By
Attorney

UNITED STATES PATENT OFFICE.

WALTER R. CEPERLY, OF CHICAGO, ILLINOIS.

WATER-KETTLE.

1,169,006.  Specification of Letters Patent.  Patented Jan. 18, 1916.

Application filed May 21, 1915. Serial No. 29,591.

*To all whom it may concern:*

Be it known that I, WALTER R. CEPERLY, a citizen of the United States, residing at Chicago, in the county of Cook and State of Illinois, have invented certain new and useful Improvements in Water-Kettles; and I do hereby declare the following to be a full, clear, and exact description of the invention, such as will enable others skilled in the art to which it appertains to make and use the same.

This invention relates to water kettles, and one of the principal objects of the invention is to provide a kettle having a surrounding heat chamber, so that the water within the kettle may be heated in a short time.

The foregoing and other objects may be attained by means of the construction illustrated in the accompanying drawing, in which—

Figure 1 is a central vertical section of a tea kettle made in accordance with this invention, and Fig. 2 is a bottom plan view of the same.

Referring to the drawing, the numeral 1 designates the outer or exterior member of the water kettle, and 2 is the inner member or lining, said members 1 and 2 being spaced apart to form a heat chamber 3 between them. The bottom 4 of the kettle is raised slightly above the lower edge of the member 1 to allow heat to circulate freely under the kettle, said bottom being provided with a shoulder 5, which extends entirely around the bottom to receive the inner member 2, and said bottom being inclined from the shoulder 5 to the outer edge 6. The portion of the bottom between the members 1 and 2 which is inclined as shown at 7, is provided with a series of perforations 8 extending entirely around at the bottom of the heat chamber 3.

The members 1 and 2 are brought up together at the top, and the member 1 is provided with a flange 9 which extends down inside of an opening in the member 2 to receive a suitable cover 10.

A bail 11 is connected to the kettle in the usual manner, and a spout 12 extends through both members 1 and 2 into the water chamber *a*.

From the foregoing it will be obvious that any form of water container, made in accordance with this invention and provided with a heat chamber entirely surrounding the water chamber, and provided with a bottom slightly raised above the outer edge of the kettle or container and having a portion provided with perforations in alinement with the heat chamber, will heat water in a very short time.

A kettle made in accordance with this invention may be conveniently used for heating or cooking various edibles, substances and material, and owing to the fact that the heat almost entirely surrounds the chamber containing the materials to be heated or cooked, there is no waste heat, and the materials will cook in a very short time.

Various changes may be made in the details of construction without departing from the spirit and scope of the invention as defined in the claim.

What is claimed is:—

A water kettle comprising an inner and outer member spaced apart providing an intermediate heat chamber, said inner member being slightly shorter than the outer member, a bottom connected to the lower edges of the outer and inner members, said bottom being provided with a shoulder extending entirely around the bottom to receive the lower edge of inner member, said bottom being inclined downwardly from the shoulder to the lower edge of the outer member and provided with perforations extending entirely around the heat chamber, and an interior water chamber.

In testimony whereof I affix my signature in presence of two witnesses.

WALTER R. CEPERLY.

Witnesses:
 FRANK McILVAINE,
 WILLIAM G. GREGORI.

Copies of this patent may be obtained for five cents each, by addressing the "Commissioner of Patents, Washington, D. C."